United States Patent

Rey et al.

[15] 3,668,076
[45] June 6, 1972

[54] DIAGNOSTIC AGENT

[72] Inventors: Hans-Georg Rey; Hans Wielinger; Peter Rieckmann, all of Mannheim-Waldhof, Germany

[73] Assignee: Boehringer Mannheim GmbH, Mannheim, Germany

[22] Filed: June 17, 1969

[21] Appl. No.: 834,178

[30] Foreign Application Priority Data

July 15, 1968 Germany.....................P 17 73 839.5

[52] U.S. Cl..................195/103.5 R, 23/230 B, 23/253 TP, 260/250, 260/247.1, 260/247.5, 260/290, 260/569, 260/268 BC
[51] Int. Cl. ......................................................G01n 31/14
[58] Field of Search............195/103.5, 103.5 C; 23/253 TP, 23/230 B

[56] References Cited

UNITED STATES PATENTS 3,233,974 2/1966 Bradley............................195/103.5 C
3,290,228 12/1966 Clissold...........................195/103.5 C Primary Examiner—Alvin E. Tanenholtz
Attorney—Burgess, Dinklage & Sprung

[57] ABSTRACT

Diagnostic agent suitable for use in carrying out rapid analytical determinations of the presence and/or concentration of hydroperoxides, substances which react with the liberation of hydrogen peroxide, peroxidase or peroxidate active substances, comprising a chromogen which is oxidized by hydroperoxide in the presence of peroxidase or peroxidate active substances to form a dyestuff, the color intensity of which is dependent on the quantity of peroxide, peroxidase or peroxidate active substance present in the test sample, wherein the chromogen is a compound having the formula:

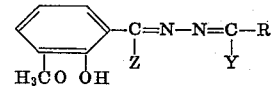

wherein Y is hydroxyl, mercapto, or amino, Z is hydroxyl, wherein Y AND Z together can represent oxygen, and R is hydrogen, mercapto, amino, lower alkyl, pyridino, morpholino, piperazinyl, arylpiperazinyl, phenyl, or phenyl substituted by one or more of hydroxyl, nitro, alkyl or alkoxyl.

9 Claims, No Drawings

DIAGNOSTIC AGENT

The present invention relates to diagnostic agents for use in carrying out rapid analytical determinations and to methods for manufacturing and using such agents.

More particularly this invention relates to diagnostic agents for use in the determination of hydroperoxides and of substances or mixtures of substances from which hydrogen peroxide or other hydroperoxides can be liberated by a previous reaction, as well as for the determination of peroxidase and of other peroxidase-active substances.

The detection of glucose in urine, blood and serum has, in the case of diabetes, acquired considerable clinical importance as has the detection of peroxidate-active substances, such as haemoglobin in urine and blood, and the detection of hydroperoxides in, for example, the milk industry, the cosmetic industry and in polymer chemistry.

A series of compounds are known which are oxidized to dyestuffs by means of hydrogen peroxide and peroxidase as catalyst. Compounds of this type include, for example, benzidine, o-dianisidine, o-tolidine and guaiacol. However, it has been established that in actual practice some of these compounds are not very stable and, further according to very recent findings, that they can also be dangerous to health of the personnel working with them so that their use does not appear to be indicated free in view of the danger to personnel and questionable reliability of results.

In accordance with the invention, it has now surprisingly been found that compounds of the following formula are very effective indicators

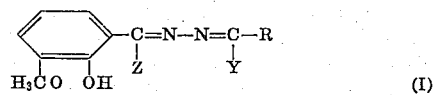

(I)

wherein Y is hydroxyl, mercapto or amino, Z is hydroxyl, wherein Y and Z together can represent oxygen and R is hydrogen, mercapto, amino, lower alkyl, pyridino, morpholino, piperazinyl, arylpiperazinyl, phenyl or phenyl substituted by at least one member selected from the group of hydroxyl, nitro, alkyl and alkoxy.

When Y is hydroxyl, mercapto or amino and Z is hydroxyl, the compounds (I) can, of course, also be present in the tautomeric form corresponding to the formula:

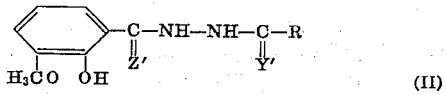

(II)

wherein Y' is oxygen, sulfur or imino, Z' is oxygen and R is as defined above.

The compounds of the above formulas are per se known in the art. See, e.g., Houben-Weyl, Sauerstoffverbindungen III, 1952, page 677; The Chemistry of Amides, Interscience Publishers (1970), edited by Jacob Zabicky, especially pages 527 and 555; Chemical Abstracts, Vol. 55, 23507b, (1961); and The Chemistry of Heterocyclic Compounds, Interscience Publishers, (1962) edited by Richard H. Wiley, pages 263, 265, 268 and 273.

The compounds of the above formulas possess better indicator properties than the previously used benzidine compounds and have been found to be particularly well suited for use in the determination of hydrogen peroxide and of other hydroperoxides, not only when optical test procedures are utilized but also in the case of reagent papers and reagent films, such as are described in U.S. Pat. application Ser. No. 683,129 now U.S. Pat. No. 3630957. These compounds, in addition, are physiologically non-toxic.

Thus, according to the present invention, there is provided a process for the determination of hydroperoxides and of substances or mixtures of substances which react with the liberation of hydrogen peroxide or of peroxidase or of peroxidate-active substances which process utilizes the reaction of hydroperoxide with a chromogen, this reaction being catalyzed by peroxidase or peroxidate-active substances to form a colored dyestuff, the color intensity of which can be evaluated in the conventional manner to indicate the quantity of hydrogenperoxide, peroxidase or peroxidate active substance in the test sample being analyzed, wherein a compound of formula (I) or (II) is used as chromogen.

The evaluation of the coloration can be carried out, for example, by optical measurement using therefor a spectrophotometer or, when test paper strips and test films are involved, by comparison of the color intensity with standard color scales or standard comparison solutions or with color charts.

The process according to the present invention can, of course, be used for the determination of the chromogens having the formulas (I) and (II) using in this connection hydroperoxides and a peroxidate-active substance, the same being particularly useful in the control and monitoring of the production of the diagnostic agents herein involved.

The determination of the presence and/or quantity of hydroperoxides by the process according to the present invention is particularly useful for coupled and uncoupled enzyme reactions, as for example, for the determination of glucose, galactose, amino acids, uric acid, peroxides, haemoglobin, peroxidase or other peroxidate-active substances, as well as of enzyme activities. Because of the increasing importance of such determinations, the routine determination of substances of this type is now an essential feature of clinical chemistry and of foodstuff chemistry.

In the case of the determination of glucose, the latter is, for example, oxidized by glucose oxidase to gluconic acid, atmospheric oxygen thereby being reduced to hydrogen peroxide. In the presence of peroxidase or of a peroxidate-active substance, the hydrogen peroxide then oxidizes the indicator or chromogen (Formulas I and II) used according to the present invention to give the corresponding color dyestuff.

Further examples of analytically useful enzyme systems of this type, which react with the liberation of hydrogen peroxide, include L-amino acid oxidase + L-amino acids, D-amino acid oxidase + D-amino acids, uricase + uric acid, xanthine oxidase + hypoxanthine or xanthine, glycine oxidase + glycine, monoamino oxidase + monoamine (such as adrenaline or mescaline), diamine oxidase + diamine (such as histamine), luciferase + luciferin, D-aspartic acid oxidase + D-aspartic acid, liver aldehyde oxidase + aldehyde, galactose oxidase + galactose and Edson's flavine enzyme + lactic acid.

According to a further feature of the present invention, there is provided a diagnostic agent for the determination of hydroperoxides and of substances or mixtures of substances which react with the liberation of hydrogen peroxide, which comprises peroxidase or a peroxidate-active substance and a chromogen having formula (I) or (II).

According to yet another feature of the present invention, there is provided a diagnostic agent for the determination of peroxidate-active substances, which comprises hydrogen peroxide or a substance or mixture of substances forming hydrogen peroxide and a chromogen having formula (I) or (II).

It is to be understood that, within the context of the present invention, the expression "a substance or mixture of substances forming hydrogen peroxide" is intended to mean not only a single compound, such as an organic peroxide, which can form hydrogen peroxide, but also a mixture such as glucose and glucose oxidase, which together form hydrogen peroxide.

It is further to be understood that the new diagnostic agents according to the present invention can be prepared in the form of solutions in appropriate solvents, if necessary with the addition of conventional adjuvants, such as buffers. Alternatively, the new diagnostic agents can be prepared in the form of test papers by the impregnation of suitable adsorbent materials, such as filter paper, with solutions of the components of the diagnostic agents. In this connection it is frequently advantageous for the test papers to contain conventional adjuvants, such as buffers. Furthermore, as already indicated hereinbefore, the diagnostic agents according to the present invention can also be prepared in the form of test films, for example, as described in U.S. application Ser. No. 683,129.

The following Examples are given for the purpose of illustrating the present invention but are in nowise to be construed as limitative thereof.

EXAMPLE 1

Determination of glucose in solutions 1 mMol of one of the indicators as set out in the following Tables I and II (in which the symbols Z, Y and R are as set out in the above formulas (I) and (II) was dissolved in 1 ml methanol and mixed with 1 ml of a solution of 143 mg glucose oxidase and 7.5 mg peroxidase in 100 ml 0.1 molar phosphate buffer (pH 7.0). When 1 ml of a glucose solution (having a glucose content of 10–1,000 mg %) was added, there was obtained the color reaction as disclosed in the right hand column of the tables which follow, the intensity of the color depending upon the concentration of the glucose.

The same results were obtained when the phosphate buffer was replaced by a citrate buffer having a pH of 7.

TABLE I

| Compound Number | Z | Y | R | Color of the reaction product |
|---|---|---|---|---|
| 1 | —OH | —OH | phenyl with —OCH$_3$ and —OH substituents | Pink. |
| 2 | —OH | —OH | pyridyl | Red violet. |
| 3 | —OH | —OH | pyridyl | Do. |
| 4 | —OH | —OH | pyridyl | Flesh colored. |
| 5 | —OH | —OH | phenyl with HO and OCH$_3$ substituents | Red. |
| 6 | —OH | —OH | —CH$_3$ | Red. |
| 7 | —OH | —SH | —NH$_2$ | Red violet. |
| 8 | —OH | —OH | HO-phenyl | Blue violet. |
| 9 | —OH | —OH | phenyl | Red violet. |
| 10 | —OH | —OH | phenyl with —NO$_2$ | Do. |
| 11 | —OH | —OH | —NH$_2$ | Orange red. |
| 12 | —OH | —NH$_2$ | —NH$_2$ | Red. |
| 13 | —OH | —OH | —N=H=O (pyrimidone) | Red orange. |
| 14 | —OH | —OH | —N=H=N—phenyl | Red violet. |
| 15 | —OH | —OH | phenyl with H$_3$C substituent | Do. |
| 16 | —OH | —OH | phenyl with HO and CH$_3$ substituents | Do. |

TABLE II

| Compound Number | Z+Y | R | Color of the Reaction product |
|---|---|---|---|
| 17 | —O— | phenyl with —OH and OCH$_3$ | Pink. |
| 18 | —O— | phenyl with HO and OCH$_3$ | Do. |
| 19 | —O— | phenyl with CH$_3$ | Do. |
| 20 | —O— | pyridyl | Do. |
| 21 | —O— | pyridyl | Do. |
| 22 | —O— | —CH$_3$ | Red. |
| 23 | —O— | —H | Red orange. |
| 24 | —O— | —SH | Pink. |

EXAMPLE 2

Test paper for use in the determination of glucose in urine 7.5 mg peroxidase and 143 mg glucose oxidase were dissolved in 100 ml of a 0.1 molar citrate or phosphate buffer having a pH of 5.6. Filter paper (Schleicher & Schull 2316) was impregnated with this solution. Thereafter, 0.1 g N-(2-hydroxy-3-methoxy-benzoyl)-N'-(pyridine-3-carbonyl)-hydrazine (compound 4 in Table I) was dissolved in 100 ml alcohol. The filter paper was again impregnated with this solution. When the resulting paper was dipped into glucose-containing urine, the white paper evidenced, above about 50 mg % glucose, a fleshy red color, the intensity of which is an indication of the glucose content.

EXAMPLE 3

Test film for use in the determination of glucose 45 g PROPIOFAN (an aqueous dispersion of polyvinyl propionate commercially available from BASF), 35 g of a solution of 37 g ALGIPON (alginic acid commercially available from Henkel, Dusseldorf, Germany) in 2 liters of a 0.5 molar phosphate buffer of pH 5.7, 1 g TEXAPON P (wetting agent commercially available from Dehydag, Dusseldorf, Germany), 10 ml water, 0.075 g peroxidase and 0.15 g glucose oxidase were stirred together to give a homogeneous slurry. 6 ml of a 5% methanolic solution of N-(2-hydroxy-3-methoxy-benzoyl)-N'-(pyridine-3-carbonyl)-hydrazine were added to the resulting mixture. Foils were coated with a layer with the mixture thus prepared having a thickness of 300 μ, which contains 0.3% of indicator, and thereafter dried.

With aqueous solutions having varying glucose concentration (for example, blood, serum or urine), there were obtained, on the colorless film, graduated fleshy red colorations corresponding to the glucose concentration.

In an analogous manner, when 2,5-di-(2-hydroxy-3-methoxy-phenyl)-oxadiazole-1,3,4 (compound 18 in Table II) was used, as indicator, pink colorations were obtained.

EXAMPLE 4

Test paper for use in the determination of peroxides in liquids 7.5 mg peroxidase were dissolved in 100 ml of a 0.1 molar citrate or phosphate buffer having a pH of 5.6. A filter paper (Schleicher & Schull 2316) was impregnated with this solution. Thereafter, 1 g N-(2-hydroxy-3-methoxy-benzoyl)-N'-(pyridine-3-carbonyl)-hydrazine was dissolved in 100 ml alcohol and the filter paper again impregnated with this solution. When the test paper thusly produced was immersed into a solution of hydrogen peroxide, the paper became clearly flesh colored even at a concentration of 0.2 γ/ml.

EXAMPLE 5

Test paper for use in the determination of blood in urine

A filter paper (2316 Schleicher & Schull) was impregnated with a 0.1 molar phosphate buffer having a pH of 7.0 in which there had been dissolved 1% TEXAPON P. Thereafter, the paper was impregnated with a 1% alcoholic solution of N-(2-hydroxy-3-methoxy-benzoyl)-N'-(pyridine-3-carbonyl)-hydrazine and dried. There was applied to the thusly produced paper a drop of blood-containing urine and a drop of 3% hydrogen peroxide, whereupon the test paper became flesh colored even at a dilution of 1:500,000.

EXAMPLE 6

Quantitative determination of glucose in liquids 0.02 ml amounts of various glucose solutions having concentrations of 0 - 300 mg % were pipetted into 2 ml of an alcoholic 0.00143 molar indicator solution of N-(2-hydroxy-3-methoxy-benzoyl)-N'-(pyridine-2-carbonyl)-hydrazine (compound 3 of Table I). There were then added thereto 2 ml of a solution of 60 mg glucose oxidase and 100 mg peroxidase in 100 ml of a 0.5 molar phosphate buffer of pH 5.7. The resultant mixture was shaken, measured at a wavelength of 492 nm and the corresponding glucose values calculated using therefor a previously prepared calibration curve.

We claim:

1. Diagnostic agent for use in the analytical determination of (a) hydroperoxide or a substance which reacts with the liberation of hydroperoxide, or (b) peroxidase or a peroxidatively active substance; which diagnostic agent comprises, in case (a), a chromogen and a member selected from the group consisting of peroxidase and peroxidatively active substances; and, in case (b), a chromogen and a member selected from the group consisting of hydroperoxide or a substance which reacts with the liberation of hydroperoxide; said chromogen having the formula:

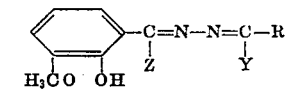

or

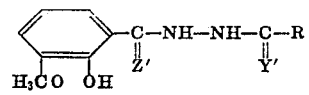

wherein Y is a member selected from the group consisting of hydroxyl, mercapto and amino; Y' is a member selected from the group consisting of oxygen, sulfur and imino; Z is hydroxyl; Z' is oxygen; and wherein Y and Z together can represent oxygen; and R is a member selected from the group consisting of hydrogen, mercapto, amino, lower alkyl, pyridino, morpholino, piperazinyl, phenylpiperazinyl, phenyl and phenyl substituted by at least one member of the group consisting of hydroxyl, nitro, alkyl and alkoxyl.

2. Diagnostic agent according to claim 1 having the formula:

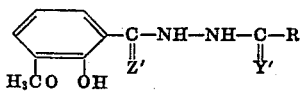

wherein Y' is a member selected from the group consisting of oxygen, sulfur and imino, Z' is oxygen and R is as defined in claim 1.

3. Diagnostic agent according to claim 1 for use in the determination of hydroperoxide, or a substance or mixture of substances which react with the liberation of hydrogen peroxide comprising a member selected from the group consisting of peroxidase and a peroxidate active substance and a chromogen as defined in claim 1.

4. Diagnostic agent according to claim 1 for use in the determination of peroxidate active substances comprising a member selected from the group consisting of hydrogen peroxide and substances forming hydrogen peroxide and a chromogen as defined in claim 1.

5. Diagnostic agent according to claim 1 in the form of a test paper impregnated with said diagnostic agent.

6. Diagnostic agent according to claim 1 in the form of a test film impregnated with said diagnostic agent.

7. Diagnostic agent according to claim 1 in the form of a solution thereof.

8. Diagnostic agent according to claim 1 wherein said chromogen is N-(2-hydroxy-3-methoxy-benzoyl)-N'-(pyridine-3-carbonyl)-hydrazine.

9. Diagnostic agent according to claim 1 wherein said chromogen is N-(2-hydroxy-3-methoxy-benzoyl)-N'-(pyridine-2-carbonyl)-hydrazine.

* * * * *